United States Patent
Bergström

(10) Patent No.: US 6,417,634 B1
(45) Date of Patent: Jul. 9, 2002

(54) DEVICE FOR RF CONTROL

(75) Inventor: Jan Olof Bergström, Uppsala (SE)

(73) Assignee: Gems Pet Systems AB, Uppsala (SE)

( * ) Notice: Subject to any disclaimer, the term of this patent is extended or adjusted under 35 U.S.C. 154(b) by 0 days.

(21) Appl. No.: 09/787,865

(22) PCT Filed: Sep. 23, 1999

(86) PCT No.: PCT/SE99/01662

§ 371 (c)(1),
(2), (4) Date: May 4, 2001

(87) PCT Pub. No.: WO00/19785

PCT Pub. Date: Apr. 6, 2000

(30) Foreign Application Priority Data

Sep. 29, 1998 (SE) .............................. 9803301

(51) Int. Cl.$^7$ ........................... H05H 13/00; G21B 1/00
(52) U.S. Cl. ........................ 315/502; 313/62; 376/112
(58) Field of Search ................ 315/502, 34, 39, 315/39.3, 39.55, 39.57; 376/112; 313/62, 359.1; H01H 13/00; G21B 1/00

(56) References Cited

U.S. PATENT DOCUMENTS

| | | | | |
|---|---|---|---|---|
| 4,761,545 A | * | 8/1988 | Marshall et al. | 250/291 |
| 4,939,740 A | * | 7/1990 | Goforth | 372/2 |
| 5,365,186 A | * | 11/1994 | Ensley | 330/4 |
| 5,365,190 A | * | 11/1994 | Yu et al. | 330/149 |
| 5,441,495 A | * | 8/1995 | Liboff et al. | 600/9 |
| 5,725,558 A | * | 3/1998 | Warnke | 607/3 |
| 5,859,501 A | * | 1/1999 | Chi | 315/111.21 |

FOREIGN PATENT DOCUMENTS

EP          0345006 A2          12/1989

OTHER PUBLICATIONS

Nuclear Instruments and Methods in Physics Research (1992), vol. A317, No. 3, 1992, S.Y. Zhang et al., pp. 405–412.
Proceedings of the Particle Accelerator Conference 1995, vol. 4, R.C. Webber et al., pp. 2687–2689.
Patent Abstracts of Japan, abstract of JP 8–88100 A Apr. 2, 1996.
Patent Abstracts of Japan, abstract of JP 10–233298 A, Sep. 2, 1998.
Patent Abstracts of Japan, abstract of JP 4–319300 A, Nov. 10, 1992.

* cited by examiner

*Primary Examiner*—Don Wong
*Assistant Examiner*—Trinh Do Dinh

(57) ABSTRACT

A method and a system for obtaining a proper resonance of the RF electrodes when using a preset or predetermined stable frequency oscillator in a cyclotron accelerator without using mechanical tuning devices. In order to maintain a high RF electrode voltage during operation the RF electrode system resonance is monitored and the frequency of the stable frequency generator is controlled by a feedback system continuously monitoring the matching of the oscillator output frequency and the resonance of the RF electrode system. Necessary small adjustments of the stable oscillator frequency to maintain a maximum matching to the resonance frequency of the RF electrode system are obtained by means of the feedback system to the stable oscillator. The feedback system relies on measured values obtained by a load phase sensor monitoring the output of the final RF power amplifier. A cyclotron control system in turn obtains the set and corrected oscillator frequency value and fine tunes further the magnetic field created in the accelerator device according to the frequency information obtained.

6 Claims, 1 Drawing Sheet

DEVICE FOR RF CONTROL

Figure 1:
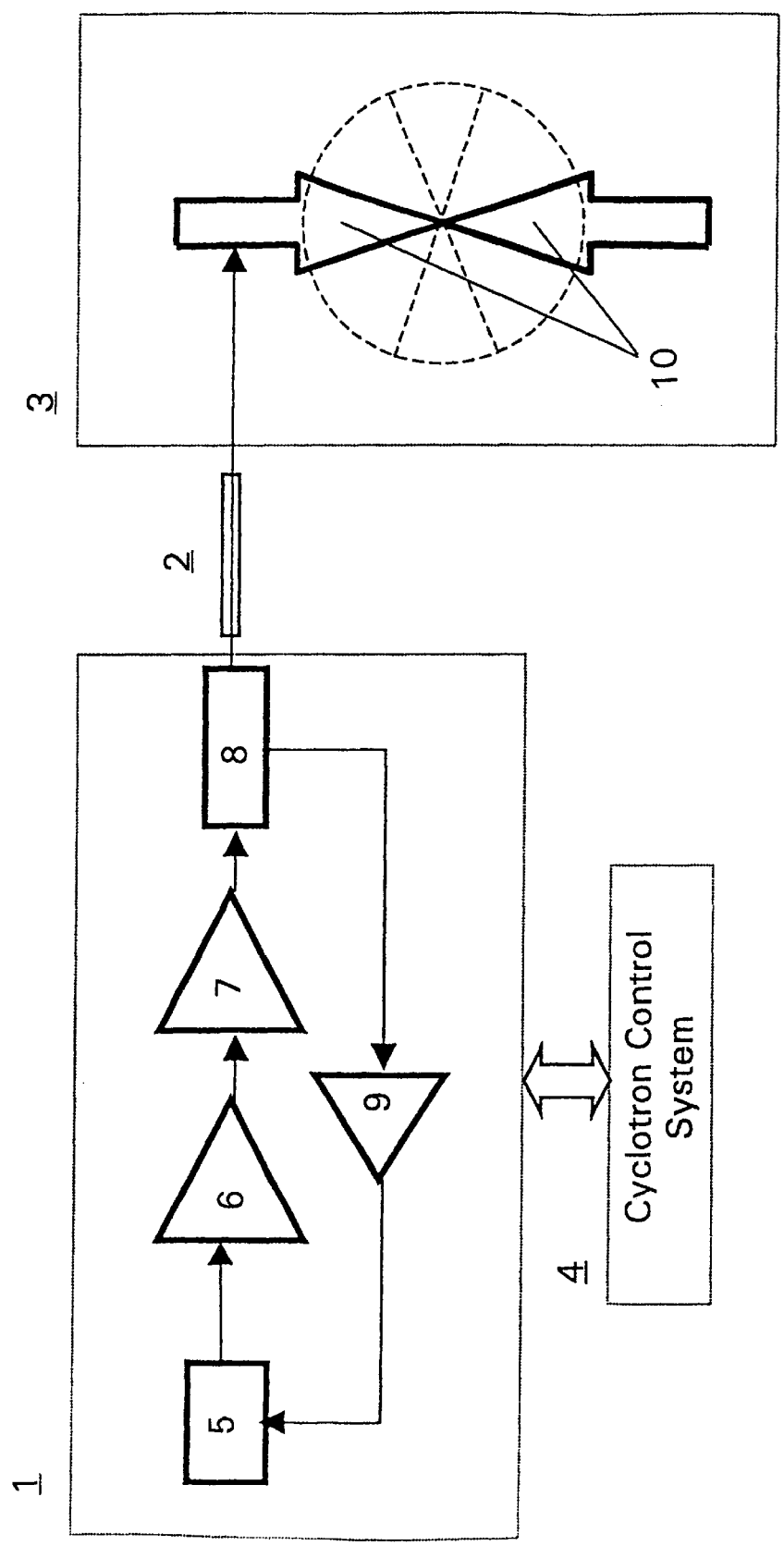

This application is the national phase under 35 U.S.C. §371 of PCT International Application No. PCT/SE99/01662 which has an International filing date of Sep. 23, 1999, which designated the United States of America and was published in English.

TECHNICAL FIELD

The present invention relates to a method and a system for Radio Frequency (RF) control and more exactly to a method and system for tuning the operation frequency and RF electrode system in a cyclotron without the use of any mechanical tuning devices.

BACKGROUND OF THE INVENTION

Production of radioisotopes normally takes place by means of a suitable particle accelerator, for instance a cyclotron, in which a beam of ions is accelerated. The radioisotopes are formed via nuclear reactions between an incident ion beam and a target medium, which can be a pressurised gas, a liquid or a solid.

The acceleration of ions in a cyclotron is performed via a so-called RF electrode system maintained at high voltage (30–40 kV) oscillating with the same period time as the orbit revolution time of the beam in the accelerating system (or a multiple thereof) as given by the average magnetic field in the cyclotron system and the mass/charge ratio of the accelerated ions.

An RF electrode system is a resonant system consisting of inductive and capacitive elements tuned to a predetermined resonance frequency. Such an RF electrode system is designed for lowest possible power consumption resulting in a design having a quite a narrow bandwidth (equal to a high Q-value). However there is a problem in that the resonance frequency of the RF electrode system will drift over time due to temperature variations and other factors affecting its resonance frequency. Such a drift of the resonance frequency means that the frequency of the applied high voltage oscillation no longer will correspond to the resonance of the RF electrodes in the accelerating system, and such a mismatch leads to a deteriorating function of the acceleration system.

There are found a number of methods for maintaining a frequency match in driven systems. In driven systems the common method is, by means of electrical motors with coupled mechanical tuning elements, to re-tune the RF electrode system to the desired frequency. In some cases the generation of the RF voltage also takes place by a freely oscillating system (i.e., not driven system) which then automatically adopts the oscillation frequency to the resonance of the electrodes. Such a system will normally be rather unstable and requires a higher degree of operator attendance, which is not desirable for a handy system to be used for producing PET isotopes for instance at a hospital facility. Besides, such a mechanical tuning system introduces a number of feeds through the vacuum casing of the accelerator, except for the maintenance problems which may arise regarding the electrical motors used as well as the mechanical tuning system itself.

Accordingly there is a need for a simple system for controlling the acceleration of the ion beam in a cyclotron accelerating system, particular a small system for producing PET isotopes emanating from acceleration of a beam of negative hydrogen ions.

SHORT DESCRIPTION OF THE INVENTION

The present invention discloses a method and a system for obtaining a proper resonance of the RF electrodes when using a pre-set or predetermined stable frequency oscillator in a cyclotron accelerator without using mechanical tuning devices. In order to maintain a high RF electrode voltage during operation the RF electrode system resonance is monitored and the frequency of the stable frequency generator is controlled by a feedback system continuously monitoring the matching of the oscillator output frequency and the resonance frequency of the RF electrode system. Necessary small adjustments of the stable oscillator frequency to maintain a maximum matching to the resonance frequency of the RF electrode system are obtained by means of the feedback system to the stable oscillator. The feedback system relies on measured values obtained by a load phase sensor monitoring the output of the final RF power amplifier. A cyclotron control system in turn obtains the set and corrected oscillator frequency value and fine tunes further the magnetic field created in the accelerator device according to the frequency information obtained.

The method according to the present invention is defined by the independent claim 1. Similarly a system incorporating the method is set forth by the independent claim 2 and further embodiments of the system are defined by the dependent claims 3–6.

SHORT DESCRIPTION OF THE DRAWINGS

The objects, features and advantages of the present invention will become apparent from the following description of the invention read in conjunction with the drawing, in which:

FIG. 1 is a block diagram illustrating a system utilising the method according to the present invention.

DESCRIPTION OF AN ILLUSTRATIVE EMBODIMENT

FIG. 1 discloses a block diagram illustrating a system applying the method according to the present invention. In the system according to FIG. 1 the stable frequency oscillator 1, which generates a predetermined frequency for the cyclotron device 3, tracks the actual resonance frequency of its RF electrode system 10 to maintain the operation of the RF electrode system at resonance for creating in the magnetic field of the cyclotron a beam of negative hydrogen ions for producing PET isotopes.

The high frequency power generator 1 is preferably of a synthesised type and frequency controlled by a feedback loop (i.e. the generated frequency will then have an offset being proportional to an analogue or a digital signal). The accelerating radio frequency signal is generated by a controlled frequency oscillator 5, the frequency of which is initially pre-set to a default frequency, in the illustrative embodiment of the order 100 MHz. The oscillator creates a signal at low power level which is amplified by a chain of amplifiers 6, 7 to a sufficient power level to obtain the necessary acceleration voltage in the RF electrode system 10, which is positioned in a space between the cyclotron magnet pole sectors in the vacuum environment and creating an acceleration path for an ion beam produced by the cyclotron.

RF power is transferred to the RF electrode system 10 via a power transmission line 2 which connects to a phase detection device, (load phase sensor) 8, arranged at the output of the final power amplifier stage 7 in the amplifier chain. In the illustrative embodiment the power transmission line consists of a standard high power 50 ohms coaxial cable. Accordingly the final amplifier 7 is designed to present a 50 ohms output impedance. The sensor device 8 detects the load phase of the load impedance of the RF electrode system 10. The power transmission line also allows for a suitable distance between the RF power generator 1 and the RF electrode system 10 in the vacuum chamber of the cyclotron 3.

Deviations from the nominal load phase (180 degrees) indicate a positive or negative resonance frequency deviation in the RF electrode system 10.

The phase deviation is converted to an error signal distributed to the controlled frequency oscillator 5 via a feedback loop containing an additional amplifier 9. The controlled frequency oscillator 5 then slightly adjusts its output frequency in this way to continuously track the resonance of the RF electrode system 10.

Even if the RF electrode system 10, has been carefully designed regarding temperature dependence and the RF electrode system furthermore being water cooled in order to minimise temperature drifts, the RF electrode system will continuously experience fluctuations in its resonance frequency. The RF electrode system, comprises two arrow-like pairs of flat electrodes 10 housed in two opposite facing valleys between pole sectors in the electromagnet's poles forming the magnetic field conditions for the spiral-formed ion beam orbits in the cyclotron 3, as indicated in FIG. 1. The distance between the electrode plates of a pair is then the same as the distance between two opposing pole sectors. An ion beam enters between the plates of one pair of electrodes and gains then a further acceleration by attraction forces exerted by the RF field and exits then immediately the RF electrode plate pair gaining further energy by repelling forces then exerted by the changing RF field. In other words the beam will experience one push when entering the RF electrode system and yet another push when exiting the electrode system if the orbit is in synchronism with the applied RF field.

Fluctuations in the resonance frequency of the RF electrode system will be handled by the feedback system containing the feedback amplifier and it will properly adjust the oscillator frequency within desired limits. However, the frequency fluctuations will sometimes also call for corrections of the magnet field (by adjustment of the current in the magnet coils) in order maintain the isochronism (magnet field/frequency relation) of the cyclotron. The cyclotron control system continuously also monitors the frequency deviation from the default frequency of the controlled high frequency oscillator 5. This monitoring in an illustrative embodiment is performed by means of a high-resolution frequency counter, which will produce a value for the operating frequency deviation. This frequency deviation is then converted into a current correction in the magnet coil supply and the magnet field will follow the frequency in a "Master-slave" fashion, thus maintaining the isochronism. The conversion into a current correction in the illustrative embodiment is primarily performed by means of a device known to a person skilled in the art and therefore not further described here. This operation is performed automatically in a preferred embodiment by also for additional information monitoring the output signal from the feedback amplifier 9.

It should also be noted that the output circuitry of the final amplifier 7 is designed to present an output impedance, nominally 50 ohms, which is kept constant within the frequency adjustment range of the stable frequency oscillator 5, i.e., presenting a certain minimum bandwidth of the order 200–300 kHz. Such circuitry configurations are well known by persons skilled in the art of radio techniques and will therefore not be further discussed in this context.

The benefit of the present method and system according to the invention is that the method and the system offer a selected fixed matched frequency for a proper resonance of the RF electrodes in a cyclotron accelerator without having to utilise any mechanically tuning devices. It will be understood by those skilled in the art that various modifications and changes may be made to the present invention without departure from the spirit and scope thereof, which will be defined by the appended claims.

What is claimed is:

1. A method for providing automatic frequency tuning for an RF electrode accelerating system (10) in a cyclotron device (3) for production of PET isotopes comprising the steps of:

generating an RF signal at predetermined frequency in a controlled frequency oscillator (5) and amplifying said predetermined RF signal by means of an amplifier chain (6, 7) to obtain a driving RF power for feeding an RF electrode system (10) within a cyclotron cavity;

outputting the driving RF power to a matched power transmission line (2) connected to and feeding said RF electrode system (10) to thereby producing a high voltage at the RF electrode system (10);

detecting a load phase by means of a load phase sensor (8) connected between a final power amplifier (7) and the power transmission line (2);

feeding the detected load phase to a feedback amplifier (9) thereby creating an error signal fed back to the frequency oscillator (5) to thereby optimise the frequency of the controlled frequency oscillator (5) for optimum matching to a resonance frequency of the RF electrode system (10); and measuring the frequency fed to the RF electrode system by means of a cyclotron control system (4), in turn controlling a magnetic field applied to the cyclotron for obtaining an optimum balance between the magnetic field and the accelerating RF voltage applied to the RF electrode accelerating system in the cyclotron.

2. A system for providing automatic frequency tuning for an RF electrode accelerating system (10) in a cyclotron device (3) for production of PET isotopes comprising cyclotron control system (4);

a controlled frequency oscillator (5) generating an RE signal of a predetermined frequency for acceleration of an ion beam in the cyclotron;

an amplifier chain (6, 7) producing a driving RF high voltage signal;

a matched power transmission line (2) connected to and feeding said RF electrode system with said REF power signal;

a load phase sensor (8) connected between said amplifier chain (6, 7) and said matched power transmission line (2), whereby the load phase sensor feeds a detected load phase to a feedback amplifier (9) producing an error signal connected to the controlled frequency oscillator (5) for a fine tuning of the controlled frequency oscillator, whereby the RF high voltage signal will continuously be optimised for a maximum transfer of signal to the RF electrode accelerating system of the cyclotron.

3. The system according to claim 2, wherein said cyclotron control system monitors frequency corrections of the RF signal and performs a corresponding adjustment to a magnetic field applied to the cyclotron (3) for obtaining optimum balance between the magnetic field and frequency of the accelerating RF voltage applied to the RF electrode accelerating system in the cyclotron (3).

4. The system according to claim 2, wherein the amplifier chains consists of a preamplifier stage (6) and a final amplifier (7) producing the driving RF power signal used for the acceleration of the ion beam.

5. The system according to claim 2, wherein the final amplifier (7) presents an output impedance which is kept constant within the frequency adjustment range of the stable frequency oscillator (5).

6. The system according to claim 5, wherein the final amplifier (7) presents an output impedance of 50 ohms for matching to the power transmission line (2).

* * * * *